Patented Apr. 19, 1938

2,114,599

UNITED STATES PATENT OFFICE 2,114,599

PREPARATIONS FOR DECREASING PERSPIRATION

Kenneth K. Jones, Chicago, Ill., assignor to Hall Laboratories, Inc., Pittsburgh, Pa., a corporation of Pennsylvania No Drawing. Application December 10, 1936, Serial No. 115,190

3 Claims. (Cl. 167—92)

This invention relates to preparations for decreasing perspiration.

In accordance with the present invention, an alkali-metal metaphosphate is employed, either alone or in conjunction with other materials for decreasing perspiration. The alkali-metal metaphosphate which I prefer to employ is the soluble sodium metaphosphate sometimes called "Graham's salt" (Textbook of Inorganic Chemistry, edited by J. Newton Friend, vol. 6, part 2, page 177, by J. B. R. Prideaux, Philadelphia, 1934; Gmelin, Handbuch der Anorganischen Chemie, vol. 21, page 922, 8th edition, Berlin, 1928); or "Graham's metaphosphate" (A Dictionary of Chemistry, by Henry Watts, vol. 4, page 578, New York, 1873; A Treatise on Chemistry, by Roscoe & Schorlemmer, vol. 2, part 1, page 283, New York, 1923). Graham's metaphosphate or salt is believed to consist principally of sodium hexametaphosphate.

I have found that the application of Graham's salt, preferably in powdered form, to the skin reduces markedly the amount of perspiration from the treated area with accompanying relief from the usually objectionable odors. In addition to decreasing perspiration, Graham's salt has a soothing effect on the skin which is extremely valuable in this connection since areas of profuse perspiration are generally irritated.

Although pure powdered Graham's salt may be used, the following mixture is preferred since its physical properties make it more suitable for application to the skin:

| | Per cent |
|---|---|
| Talc | 70 |
| Lycopodium | 5 |
| Powdered Graham's salt | 25 |

While the powder is preferred, this invention may also be carried out by using vehicles other than powder, such as glyceryl-monostearate, mineral oil, colloidal clay and glycerin, mucilage of Irish moss, and the like, when it is desired to prepare a paste. Waxes may be used to carry the Graham's salt, or Graham's salt and other materials, when a stick deodorant is desired. Application of an aqueous solution of Graham's salt to the skin also is efficacious.

While I prefer to use sodium metaphosphate, other alkali-metal metaphosphates may be used, such, for example, as potassium metaphosphate, lithium metaphosphate and ammonium metaphosphate. All of these metaphosphates are preferably used in the soluble form commonly known as hexametaphosphate.

Although I have given by way of example only, certain materials which may be mixed with the Graham's salt and have given a preferred composition, it is to be understood that this is not to be regarded as limiting the invention to these materials or the example given, since the active ingredient is an alkali-metal metaphosphate, such as Graham's salt, which may be used alone or with any other material compatible with it so as to produce a mixture which is safe and easy to use on the human skin.

I claim:

1. A preparation for decreasing perspiration, said preparation containing an alkali-metal metaphosphate as its essential ingredient.

2. A preparation for decreasing perspiration, said preparation containing Graham's salt as its essential ingredient.

3. A preparation for decreasing perspiration, said preparation being in powdered form and containing talc, lycopodium and Graham's salt.

KENNETH K. JONES.